US012663123B2

(12) United States Patent
Pi et al.

(10) Patent No.: US 12,663,123 B2
(45) Date of Patent: Jun. 23, 2026

(54) PRODUCTION PROCESS OF WHITE COATED LED FILAMENT

(71) Applicant: Zhongshan Mulinsen Electronics Co., Ltd., Zhongshan (CN)

(72) Inventors: Baoqing Pi, Zhongshan (CN); Jiwei Liu, Zhongshan (CN); Yunfeng Zhao, Zhongshan (CN); Xuezhao He, Zhongshan (CN); Yahui Xu, Zhongshan (CN)

(73) Assignee: Zhongshan Mulinsen Electronics Co., Ltd., Zhongshan (CN)

( * ) Notice: Subject to any disclaimer, the term of this patent is extended or adjusted under 35 U.S.C. 154(b) by 0 days.

(21) Appl. No.: 18/293,285

(22) PCT Filed: May 16, 2023

(86) PCT No.: PCT/CN2023/094498

§ 371 (c)(1),
(2) Date: Jul. 30, 2025

(87) PCT Pub. No.: WO2024/119714

PCT Pub. Date: Jun. 13, 2024

(65) Prior Publication Data

US 2026/0055856 A1 Feb. 26, 2026

(30) Foreign Application Priority Data

Dec. 6, 2022 (CN) ........................ 202211557156.0

(51) Int. Cl.
*F21K 9/232* (2016.01)
*F21K 9/90* (2016.01)
*F21Y 103/30* (2016.01)

(52) U.S. Cl.
CPC ................ *F21K 9/232* (2016.08); *F21K 9/90* (2013.01); *F21Y 2103/30* (2016.08)

(58) Field of Classification Search
CPC ............... F21K 9/232; F21K 9/90; F21V 3/10
(Continued)

(56) References Cited

U.S. PATENT DOCUMENTS

2019/0154206 A1* 5/2019 Jiang ...................... F21K 9/232

FOREIGN PATENT DOCUMENTS

| | | |
|---|---|---|
| CN | 103879099 A | 6/2014 |
| CN | 109723984 A | 5/2019 |
| CN | 114023865 A | 2/2022 |

* cited by examiner

*Primary Examiner* — Thomas M Sember
(74) *Attorney, Agent, or Firm* — JEEN IP LAW, LLC

(57) ABSTRACT

The present invention provides a white coated LED filament and its production process and LED bulb, optimizing the white coated powder from being painted originally on internal surface of the glass shell to be painted on the surface of the filament, thus forms a coated white layer on the surface of the filament, and bonds whit the filaments for one-time molding, which simplifies the existing internal powder painting process of the glass shells, and reduces the cost of the finished products in terms of the usage and production of the clients, and also greatly improving the stability of the white coated filament bulbs, so that the color bleaching and its photoelectric parameters are in a manageable state, therefore the production process is become simply, the cost is lower, and improve the clients' usage scope, reduce the clients' usage cost, and can satisfy the existing market client's requirements for the product of the filaments bulbs with white coated.

1 Claim, 5 Drawing Sheets

(58) Field of Classification Search
USPC ............................ 362/84, 231, 293; 313/485
See application file for complete search history.

PRODUCTION PROCESS OF WHITE COATED LED FILAMENT

CROSS-REFERENCE TO RELATED APPLICATIONS

The application claims priority to Chinese patent application No. 202211557156.0, filed on Dec. 6, 2022, the entire contents of which are incorporated herein by reference.

TECHNICAL FIELD

The present invention relates to the field of LED (Light Emitting Diode), and particularly relates to a white coated LED filament, its production process and an LED bulb.

BACKGROUND

With the continuous development of LED filament bulb, the requirements of the LED filament bulb to be coated with white are becoming more and more stringent. The present production process of the white coated filament bulb, is to first apply white coated power to the internal surface of the glass shell, and again with the filament for secondary bonding. The production process is complicated, the production cost is high, and the existing glass shell coated white layer is unstable and prone to color bleaching and its photoelectric parameters can be unstable.

SUMMARY

In order to overcome the complexity production process and high production cost of the existing white coated filament, and the instability of its white coated layer of the glass shell, the present invention, on the one hand, provides a white coated LED filament.

A white coated LED filament, comprising a filament body, and the filament body comprising a substrate in the form of an elongated strip, a plurality of LED chips distributed in series on the substrate, and a package layer wrapping around the LED chips, wherein the white coated LED filament also includes a white coated layer on the surface of the package layer.

According to the white coated LED filament as mentioned above, the white coated layer consists of the materials in the following weights: 10 parts of glue, 0.1 to 100 parts of white coated powder. The glue is silica gel, epoxy resin glue or modified epoxy silicone resin glue, and the white coated powder is titanium dioxide, silicon dioxide or barium sulfate.

According to the white coated LED filament as mentioned above, the substrate is any one of flexible FPC (Flexible Printed Circuit) substrate, ceramic substrate or glass fiber substrate.

According to the white coated LED filament as mentioned above, the package layer is a fluorescent gel, and warps around both sides of the substrate.

According to the white coated LED filament as mentioned above, the white coated layer wraps around the filament body.

According to the white coated LED filament as mentioned above, the thickness is 1 μm to 5000 μm.

On the other hand, the present invention also provides a production process of the white coated LED filament.

A production process of white coated LED filament, comprising painting glue doped with white coated powder to the surface of the filament body to form a white coated layer on the surface of package layer.

According to the production process of white coated LED filament as mentioned above, the glue is painted on the surface of the filament body by printing or dispensing to form a white coated layer.

According to the production process of white coated LED filament as mentioned above, the dispensing steps includes:

Fixing the filament body that has molded fluorescent gel on the surface;

Loading the glue mixed with white coated powder into the glue dispenser;

Using the glue dispenser to paint the glue mixed with white coated powder on one side of the surface of the filament body at first, and then turns the filament body to paint the other side of the surface;

Drying after painting, the drying condition for the first is 80° C.-300° C./0.1 h-1.5 h, and then turn to a long bake for 100° C.-300° C./2 h-8 h.

The third purpose of the present invention is provides an LED bulb.

An LED bulb, at least comprises a bulb shell, wherein the white coated LED filament as mentioned above is arranged in the bulb shell.

Compared with the existing technology, the present invention has the following beneficial effects.

1. The present invention provides a white coated LED filament, optimizing the white coated powder from being painted originally on internal surface of the glass shell to be painted on the surface of the filament, so that it forms a white coated layer on the surface of filament, and bonds with the filament for one-time molding. Thus simplifies the existing internal coating process of glass shells, and reduces the cost of the finished products in terms of use and production.
2. The present invention provides a production process of the white coated LED filament, optimizing the original process of white painting, the white coated powder from being painted on internal surface of the glass shell to be painted on the surface of the filament, and bonds with the filament for one-time molding, which greatly improves the stability of the white coated filament bulbs, so that the color bleaching and its photoelectric parameters are in a manageable state, therefore the production process is become simply, the cost is lower, and to improve the clients' usage scope, reduce the clients' usage cost.
3. The present invention provides an LED light bulb, moving the powder painting process of the white coated bulb from the glass shell to the surface of the filament, and bonds with the filament for one-time molding, thus reduces the cost of use, simplifies the existing internal powder painting process of glass shells, and reduce the cost of the finished products in terms of use and production, which can satisfy the existing market client's requirements for the products of the filament bulbs with white coated.

BRIEF DESCRIPTION OF DRAWINGS

In order to more clearly illustrate the technical solutions in the embodiment of the present invention, the accompanying drawings to be used in the description of the embodiment will be briefly described below.

DETAILED DESCRIPTION OF THE EMBODIMENTS

Figure 1:
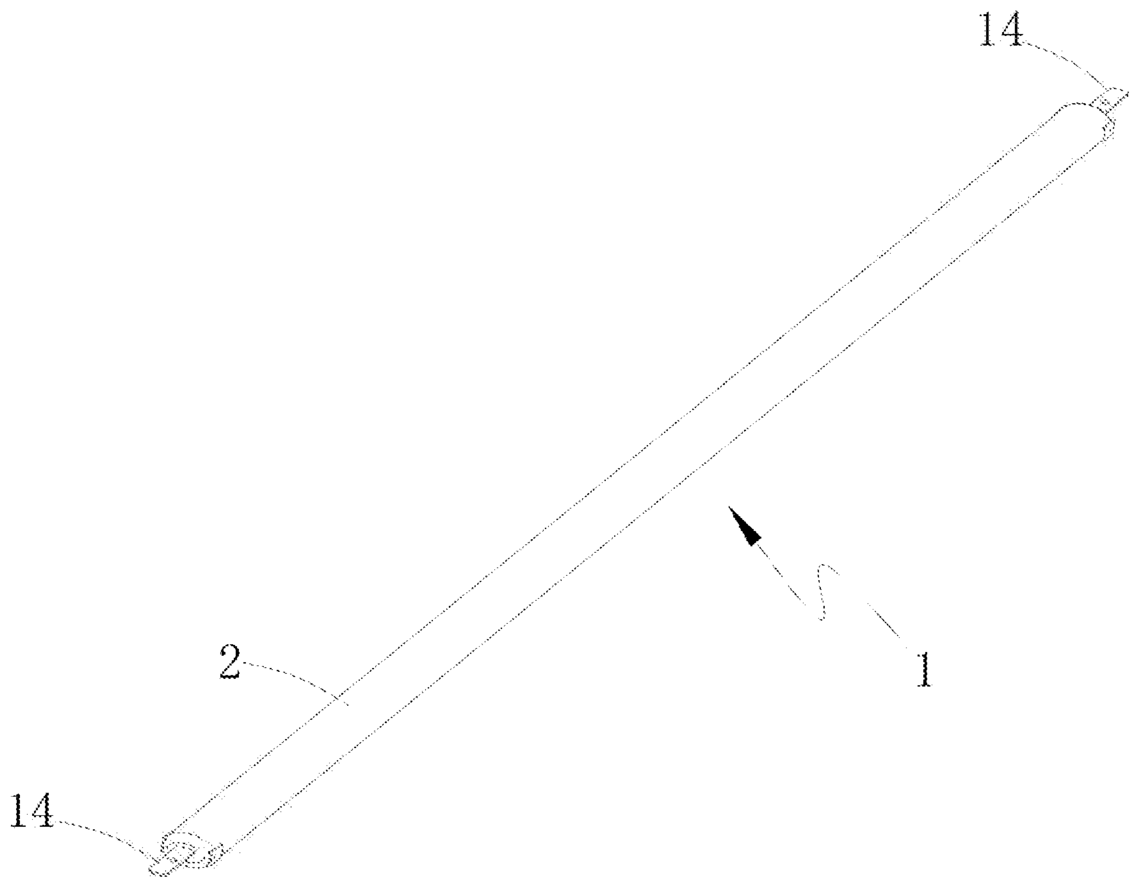
FIG. 1 is a schematic structural view of a white coated LED filament in an embodiment of the present invention.
Figure 2:
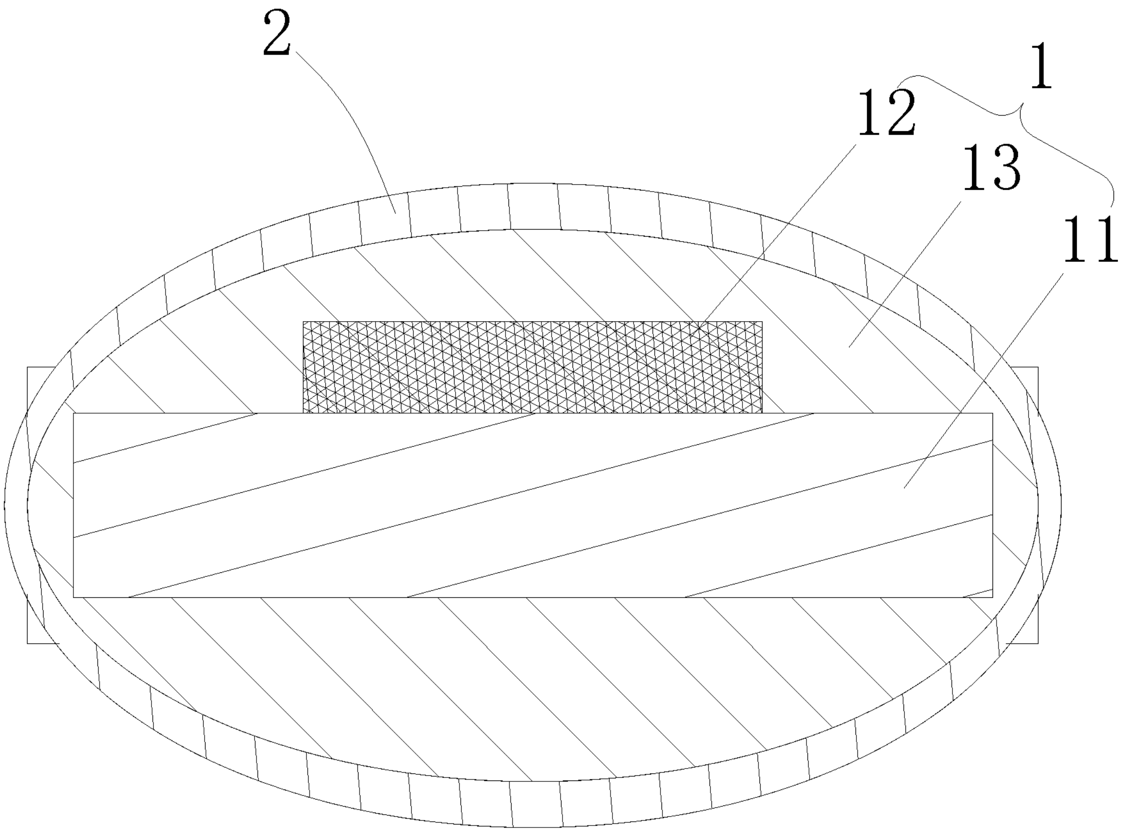
FIG. 2 is a schematic cross-sectional view of the white coated LED filament in the embodiment of the present invention.
Figure 3:
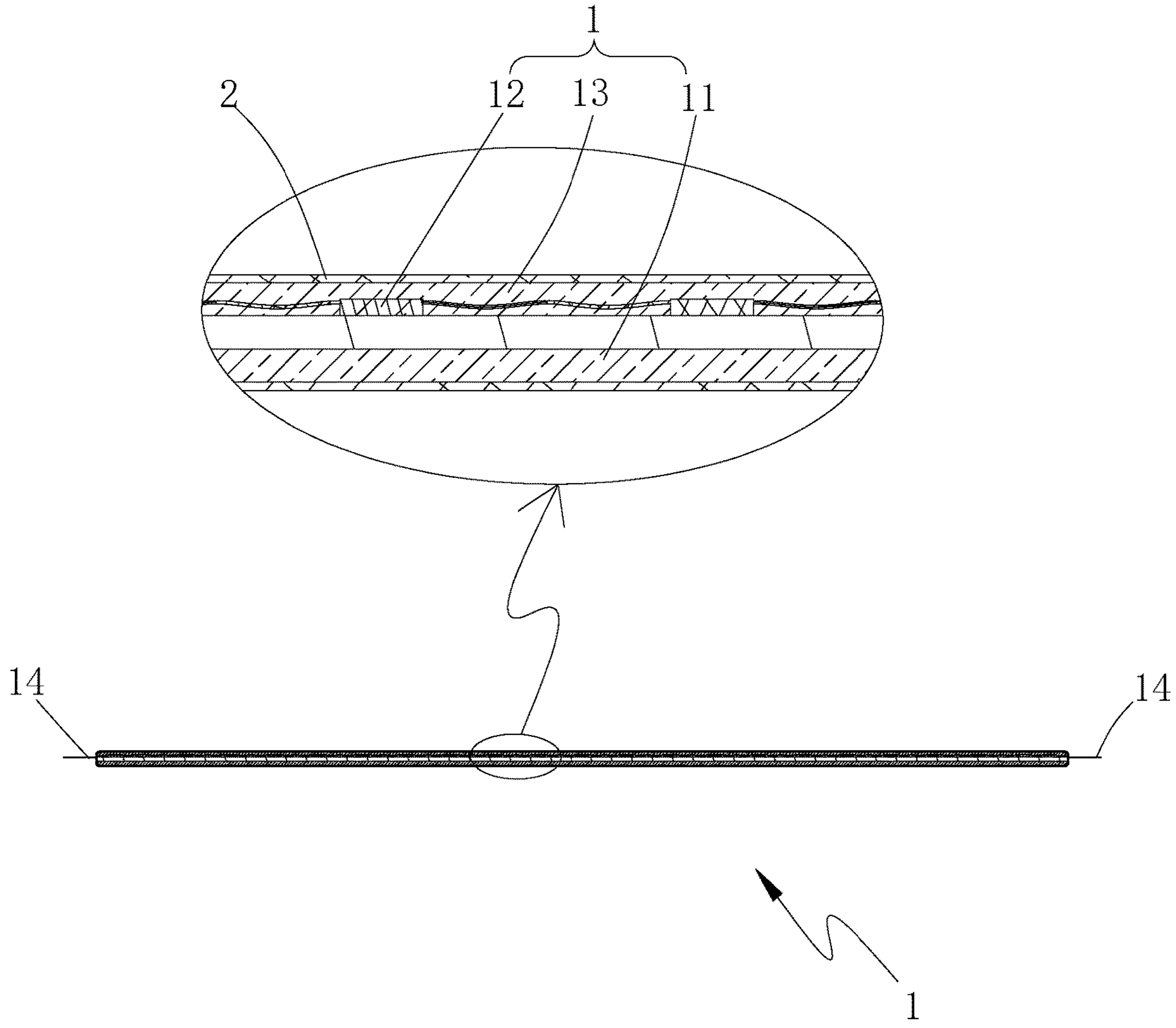
FIG. 3 is a schematic longitudinal-section view of the white coated LED filament in the embodiment of the present invention.
Figure 4:
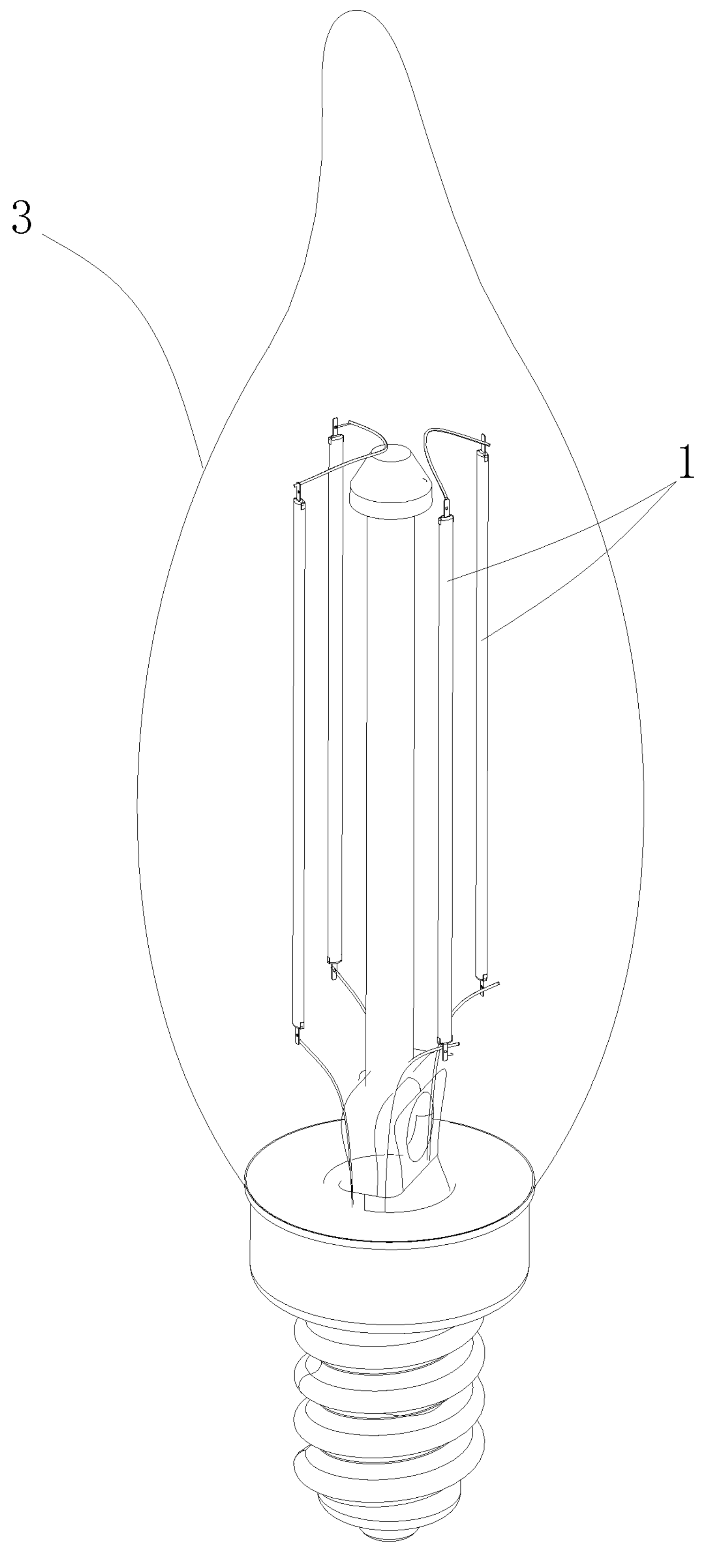
FIG. 4 is a schematic structural view of an LED bulb in the embodiment of the present invention.

A white coated LED filament comprises a filament body 1, wherein the filament body 1 comprises a substrate 11 in the form of an elongated strip, a plurality of LED chips 12 distributed in series on the substrate 11, and a package layer 13 wrapping around the LED chips 12. The white coated LED filament also includes a white coated layer 2 on a surface of the package layer 13.

The present invention provides a white coated LED filament, optimizing the white coated powder from being painted originally on internal surface of the glass shell to be painted on the surface of the filament, so that it forms a white coated layer on the surface of the filament, and bonds with the filament for one-time molding. Thus simplify the existing internal coating process of glass shell, and reduce the cost of the finished products in terms of use and production.

Further, the white coated layer 2 consists of the materials in the following weights: 10 parts of glue, 0.1 to 100 parts of white coated powder, and the white coated powder will not be able to realize the white effect when the ratio of the white coated powder is less than 10:0.01, and will not be able to complete the painting process when the ratio of the white coated powder is more than 10:100.

Further, the glue is silica gel, epoxy resin glue or modified epoxy silicone resin glue, and the white coated powder is titanium dioxide, silicon dioxide or barium sulfate, etc.

Figure 5:
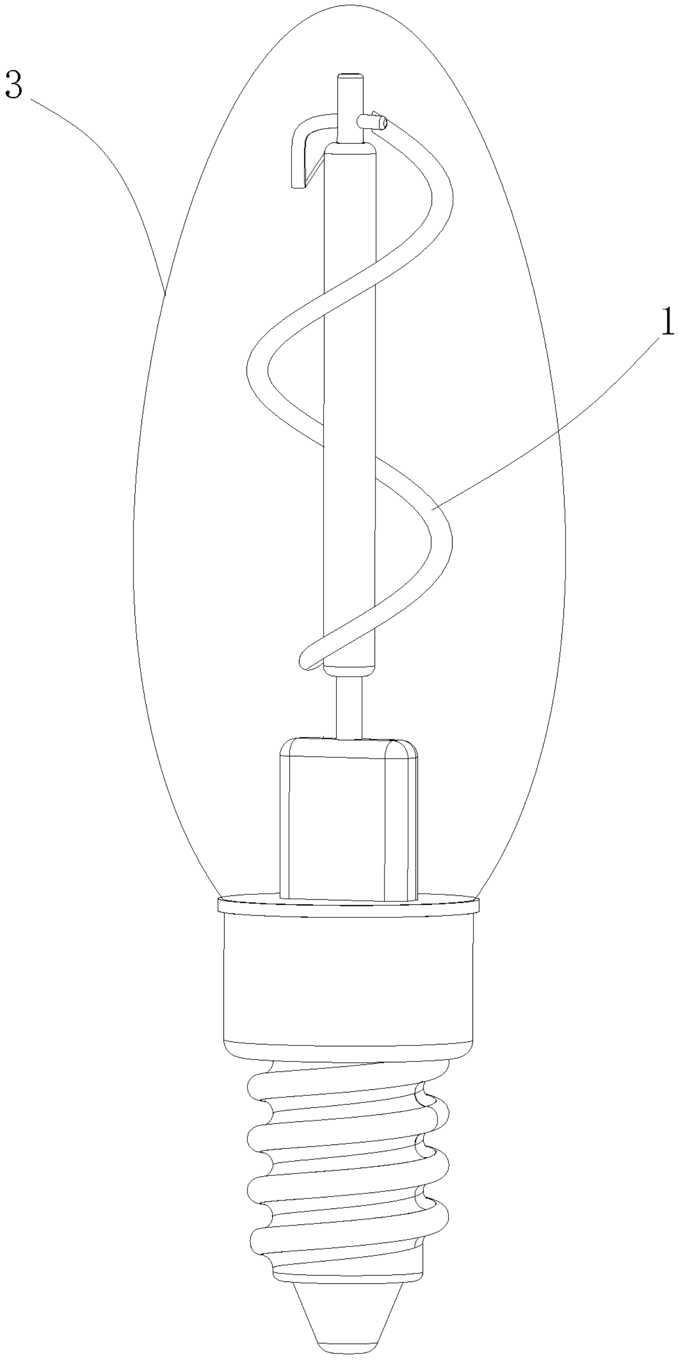
FIG. 5 is a schematic structural view of the LED bulb in another embodiment of the present invention.

Further, the white coated process of the present invention may be adapted to existing LED substrates, however, it is not limited to any one of flexible FPC substrates, ceramic substrates, or glass fiber substrates, such as FIG. 1 to FIG. 4, a case of ceramic substrate and FIG. 5 is a case of flexible FPC substrate.

Further, the package layer 13 wraps around both sides of the substrate 11, and the package layer 13 is made of fluorescent gel by which the LED chips 12 are encapsulated.

Further, the white coated layer 2 wraps around the filament body 1, moving the white coated powder from being painted originally on the internal surface of the glass shell, to be painted on the surface of the filament, and bonds with the filament for a one-time molding. With the white coated layer, the filament body has a better diffusion performance, so that the light emits soft and not dazzling.

Further, a thickness of the white coated layer 2 is 1 μm to 5000 μm, the thickness lower than 1 μm will not achieve the purpose of reducing diffusion, while the thickness higher than 5000 μm is a waste of cost, the present invention can effectively overcome the deficiency of the unstable coating of the existing white coated filament bulbs, and make white coated filament bulbs without losing the lumen of the whole bulb.

Further, both ends of the substrate 11 are provided with electrical connection terminals 14, the substrate 11 through the electrical connection terminals 14 connects to an external power supply for powering to the LED chips 12.

A production process of white coated LED filament comprises painting glue doped with white coated powder in white high reflectivity on the surface of the filament body 1 to form a white coated layer 2 on the surface of the package layer 13. This production process has low production cost compared to the conventional white coated filament bulbs production process, optimizing the original process of white painting by painting the white coated powder from being painted originally on internal surface of the glass shells to be pained on the surface of the filament, and bonding with the filaments for one-time molding, which greatly improves the stability of white coated filament bulbs, makes the color bleaching and its photoelectric parameters in a controllable state, and improves the clients' usage scope, reduces the clients' usage cost.

Further, in the present invention, the white coated layer 2 is formed on the surface of the filament body 1 by brushing using printing or dispensing. In the present invention, the white coated powder bonds with the filament for one-time molding by painting or dispensing, which greatly improves the stability of the white coated filament bulbs, makes the color bleaching and its photoelectric parameters in a controllable state. Thus can improve the clients' usage scope, reduce the clients' usage cost, and improve the competitive advantage of our filaments.

Further, the dispensing steps includes:

Step S1: Fixing. Fix the filament body 1 first.

Step S2: Loading fluorescent gel. Loading the evenly mixed fluorescent gel into the glue dispenser.

Step S3: Painting the glue. Using the glue dispenser to paint one side of the filament body 1 at first, and then turns the filament body 1 over to paint the other side of the surface of the filament body 1.

Step S4: Drying. A condition of drying is 80° C.-300° C./0.1 h-1.5 h, and the fluorescent gel will mold rapidly.

Step S5: Loading glue. Loading the glue mixed with white coated powder into the glue dispenser.

Step S6: Painting the glue. Using the glue dispenser to paint one side of the filament body 1 at first, and then turns the filament body 1 over to paint the other side of the surface of the filament body 1;

Step S7: Drying. A condition of drying for the first 80° C.-300° C./0.1 h-1.5 h, and then turn to a long-time bake for 100° C.-300° C./2 h-8 h, the long-time bake is conducive to a better combination of fluorescent gel layer and the white glue layer, and eliminate the colloid internal stress, improve the product performance.

An LED light bulb, at least comprises a bulb shell 3, the white coated LED filament is arranged in the bulb shell 3, and the LED chips and substrate can be completely isolated from the air through the bulb shell, avoiding the oxidation of the LED chips and the substrate. LED chips can be in a confined space for good operation, and the bulb shells creates an environment for the use of the LED filament that greatly improves the service life of the LED filament. The present invention moves the powder coating process of the glass shell of the white coated bulb to the surface of the filament, and bonds with the filament for one-time molding, reduces the usage of cost, simplify the existing glass shells internal powder painting process, reduce the cost of the finished products in terms of use and production, thus can satisfy the existing market clients' requirements for the product of the filament bulbs with white coated.

The performance test of the white coated filament bulb prepared by the embodiment was tested against the existing white coated glass shell bulb, and the test results are as follows:

Form 1: The embodiment of performance test results on using white coated filament bulb.

| Vollage (V) | Current (A) | Power (W) | Power factor | Lumen (lm/w) | Efficacy (Lm/w) | X-axis | Y-axis | CT(K) | Ra | R9 | SDCM |
|---|---|---|---|---|---|---|---|---|---|---|---|
| | | 6.24 | | 886.6 | | | | 4260 | | | 6 |
| | | 6 | | 806 | | | | 4000 | | | |
| | | 5.76 | 0.5 | 741.52 | 0 | | | 3710 | 80 | 0 | |
| 230.00 | 0.0354 | 5.94 | 0.73 | 818.80 | 137.81 | 0.3845 | 0.3786 | 3904 | 85.4 | 63.0 | 3.4 |
| 230.00 | 0.0354 | 5.96 | 0.74 | 843.50 | 141.59 | 0.3840 | 0.3787 | 3918 | 85.6 | 63.0 | 3.0 |
| 230.00 | 0.0349 | 5.89 | 0.74 | 821.00 | 139.49 | 0.3853 | 0.3804 | 3897 | 85.7 | 63.0 | 3.2 |
| 230.00 | 0.035 | 5.89 | 0.74 | 826.00 | 140.34 | 0.3843 | 0.3793 | 3916 | 85.4 | 63.0 | 2.9 |
| 230.00 | 0.035 | 5.89 | 0.74 | 825.00 | 140.05 | 0.3844 | 0.3792 | 3913 | 85.5 | 63.0 | 3.0 |

Form 2: The embodiment of performance test results on using white coated glass shell bulb.

| Vollage (V) | Current (A) | Power (W) | Power factor | Lumen (lm/w) | Efficacy (Lm/w) | X-axis | Y-axis | CT(K) | Ra | R9 | SDCM |
|---|---|---|---|---|---|---|---|---|---|---|---|
| | | 6.6 | | 825 | | | | 4260 | | | 6 |
| | | 6 | | 750 | | | | 4000 | | | |
| | | 5.4 | 0.5 | 675 | 0 | | | 3710 | 80 | 0 | |
| 230.2 | 0.0479 | 6.01 | 0.545 | 804.20 | 133.80 | 0.3882 | 0.3846 | 3854 | 81.9 | 5.0 | 4.0 |
| 230.2 | 0.0480 | 6.06 | 0.549 | 815.09 | 134.50 | 0.3852 | 0.3820 | 3912 | 82.3 | 7.0 | 2.7 |
| 230.2 | 0.0485 | 6.12 | 0.549 | 812.51 | 132.70 | 0.3903 | 0.3864 | 3816 | 81.7 | 5.0 | 4.9 |
| 230.2 | 0.0486 | 6.11 | 0.546 | 799.53 | 130.80 | 0.3882 | 0.3840 | 3851 | 82.0 | 6.0 | 4.1 |
| 230.2 | 0.0491 | 6.20 | 0.548 | 823.89 | 133.00 | 0.3909 | 0.3863 | 3799 | 81.3 | 3.0 | 5.3 |

According to the test results, In the present invention, the usage of the white coated filament in the present embodiment is with higher brightness of white painting and luminous efficacy, and also with more concentrated color tolerance than the usage of the use of white coated glass shell bulb in the contrasted embodiment. The present invention optimizes the original process of white painting, the white coated powder from being painted originally on internal surface of the glass shell to be painted on the surface of the filament, and bonds with the filament for one-time molding, which greatly improves the stability of the white coated filament bulbs, so that the color bleaching and its photoelectric parameters are in a manageable state, therefore the production process is become simply, the cost is lower, and to improve the clients' usage scope, reduce the clients' usage cost.

The foregoing is only a preferred embodiment of the present invention, and is not intended to limit the present invention, and any modifications, equivalent substitutions and improvements made within the spirit and principles of the present invention shall be included in the scope of protection of the present invention.

What is claimed is:

1. A production process of white coated LED (Light Emitting Diode) filament, wherein the white coated LED filament comprises a filament body, the filament body comprises a substrate in the form of an elongated strip, a plurality of LED chips distributed in series on the substrate, and a package layer wrapping around the LED chips, the white coated LED filament further comprises a white coated layer coated on a surface of the package layer, wherein the production process comprises painting glue doped with white coated powder on a surface of the filament body to form a white coated layer on a surface of the package layer, the white coated layer is formed on the surface of the filament body by brushing using printing or dispensing, wherein the dispensing steps includes:

fixing the filament body that has molded fluorescent gel on the surface;

loading the glue mixed with white coated powder into the glue dispenser;

using the glue dispenser to paint the glue mixed with white coated powder on one side of the surface of the filament body at first, and then turn the filament body to paint the other side of the surface;

drying after painting, wherein drying condition for the first is 80° C.-300° C./0.1 h-1.5 h, and then turns to a long bake for 100° C.-300° C./2 h-8 h.

* * * * *